(12) United States Patent
Fischer et al.

(10) Patent No.: US 12,330,614 B2
(45) Date of Patent: Jun. 17, 2025

(54) CONTROL APPARATUS AND CONTROL METHOD FOR AN ANTI-SLIDE SYSTEM

(71) Applicant: KNORR-BREMSE SYSTEME FÜR SCHIENENFAHRZEUGE GMBH, Munich (DE)

(72) Inventors: Marcus Fischer, Munich (DE); Thomas Rasel, Höhenkirchen-Siegertsbrunn (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 190 days.

(21) Appl. No.: 18/016,167

(22) PCT Filed: Jul. 2, 2021

(86) PCT No.: PCT/EP2021/068297
§ 371 (c)(1),
(2) Date: Jan. 13, 2023

(87) PCT Pub. No.: WO2022/012966
PCT Pub. Date: Jan. 20, 2022

(65) Prior Publication Data
US 2023/0211758 A1    Jul. 6, 2023

(30) Foreign Application Priority Data
Jul. 13, 2020 (DE) ..................... 10 2020 118 360.7

(51) Int. Cl.
*B60T 8/17* (2006.01)
(52) U.S. Cl.
CPC .................. *B60T 8/1705* (2013.01)
(58) Field of Classification Search
CPC ............. B60T 8/1706; B60T 8/17616
See application file for complete search history.

(56) References Cited

U.S. PATENT DOCUMENTS 8,838,356 B2 * 9/2014 Mederer ................. B60T 8/327
701/81
2018/0281759 A1 * 10/2018 Rasel ................ B60T 8/17616
(Continued)

FOREIGN PATENT DOCUMENTS

DE    102006057813 A1 *  6/2008  ............ B60T 8/1705
DE    102014204814 A1     9/2015
(Continued)

OTHER PUBLICATIONS

International Search Report and Written Opinion corresponding to PCT/EP2021/068297 dated Oct. 11, 2021.

*Primary Examiner* — George C Jin
(74) *Attorney, Agent, or Firm* — Barnes & Thornburg LLP

(57) ABSTRACT

A control apparatus for an anti-slide system of a rail vehicle includes a slip control device, which is designed to determine a slip between the wheel and a rail operatively connected thereto from the sensed state variables, the slip control device being designed to actuate the actuator by the output device. The control apparatus further has a slip limiting device, which is designed to specify a slip range for the slip control device, wherein the slip limiting device has at least a first operating mode and a second operating mode, which can be switched over by an operating mode signal, wherein a first slip range is assigned to the first operating mode and a second slip range is assigned to the second operating mode. A corresponding control method makes control of an actuation value for the actuator possible in order to adjust the slip in a predetermined slip range.

13 Claims, 3 Drawing Sheets

(56) References Cited

U.S. PATENT DOCUMENTS

2022/0203946 A1* 6/2022 Tione .................... B60T 8/3655
2023/0211758 A1* 7/2023 Fischer ................ B60T 8/1705
　　　　　　　　　　　　　　　　　　　　　　　　701/71

FOREIGN PATENT DOCUMENTS

| DE | 102015116862 A1 | 4/2017 |
| EP | 0876944 A2 | 11/1998 |
| EP | 1190889 A2 | 3/2002 |
| EP | 3451675 A1 | 3/2019 |

* cited by examiner

CONTROL APPARATUS AND CONTROL METHOD FOR AN ANTI-SLIDE SYSTEM

CROSS REFERENCE AND PRIORITY CLAIM

This patent application is a U.S. National Phase of International Patent Application No. PCT/EP2021/068297 filed Jul. 2, 2021, which claims priority to German Patent Application No. 10 2020 118 360.7, the disclosure of which being incorporated herein by reference in their entireties.

FIELD

Disclosed embodiments relate to a control apparatus for an anti-slide system of a rail vehicle.

BACKGROUND

Damage or increased wear on wheel and rail is, thus, to be avoided and nonetheless the shortest possible braking distances are to be achieved here even in the event of differing rail conditions or adhesion states, for example, which are changed due to environmental influences. If the slip ranges are permanently selected deviating from the standard (see, for example, UIC 541-05), in particular the minimum value of the slip is too small or the maximum value of the slip is too large, this then results (in the case of excessive slip) in increased wear on the running surfaces of the wheels and the rails due to the elevated friction. This causes increased operating costs for maintenance work.

Industry norms therefore limit the slip ranges which are generally available (for example, information sheet UIC 541-05), in particular the maximum slip. In certain situations, it is necessary to stop a rail vehicle as quickly as possible. In this case, the limiting of the slip range can result in lengthening of the braking distance (longer than theoretically technically possible), which reduces the safety.

SUMMARY

Against this background, disclosed embodiments improve the safety of an anti-slide system while not increasing the operating costs unnecessarily at the same time.

Disclosed embodiments relate to a control apparatus for an anti-slide system of a rail vehicle.

The anti-slide system has at least one activatable actuator device for setting a braking force or a slip of a braking device of a wheel/wheel set (the use of wheel is equivalent to the use of wheel set hereinafter) and at least one sensor device for detecting at least one state variable (pressure, velocity, braking force, vehicle mass, etc.). Furthermore, the control apparatus has an input device for recording the detected state variable and an output device for activating the actuator device. The control apparatus has a slip control device (or braking force control device), which is configured to ascertain a slip/the braking force between the wheel and a rail operationally connected thereto from the detected state variables. In addition, the slip control device is configured to activate the actuator device by the output device. Disclosed embodiments additionally relate to a control method for such a control apparatus. Control apparatuses for anti-slide systems set actuator devices of braking devices in such a way that in particular excessive slip between wheels and rails in contact therewith is avoided.

BRIEF DESCRIPTION OF THE FIGURES

Advantageous features and embodiments are apparent from the appended figures, which show embodiments solely schematically. In the specific figures.

DETAILED DESCRIPTION

Figure 1:
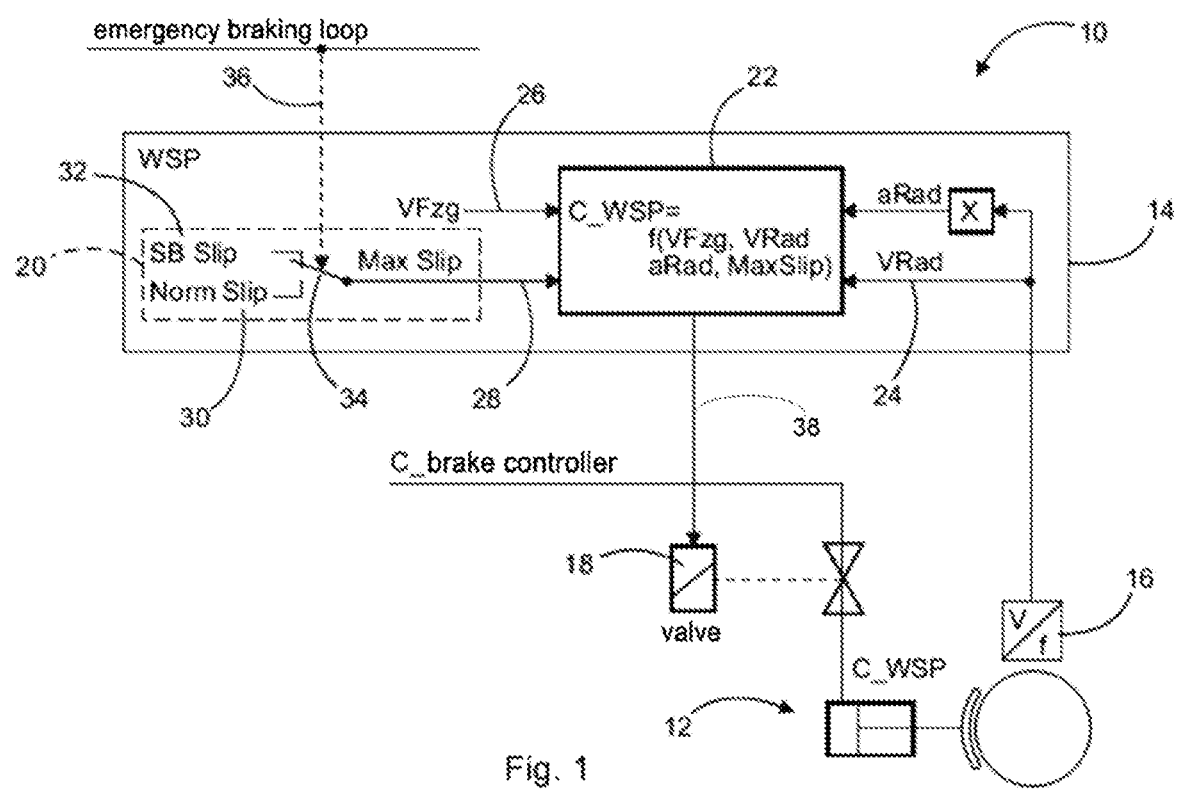
FIG. 1 shows a schematic illustration of a braking device and an anti-slide system having a control apparatus according to a disclosed embodiment.

In accordance with the disclosed embodiments, a control apparatus for an anti-slide system of a rail vehicle has at least one activatable actuator device for setting a braking force of a braking device of a wheel and at least one sensor device for detecting at least one state variable. The control apparatus has a slip control device (for example, by force control, in that the system searches for the range of greatest force transmission), which is configured to ascertain a slip between the wheel and a rail operationally connected thereto from the detected state variables, wherein the slip control device is additionally configured to activate the actuator device by the output device. The control apparatus has a slip limiting device, which is configured to specify a slip range/maximum slip for the slip control device. Either a maximum slip or a slip range can, thus, be specified (if the maximum slip is specified, an upper limit is so to speak specified—if a slip range is specified, a lower and an upper limit of the slip are specified). The slip limiting device has at least one first operating mode and one second operating mode, which can be switched over by an operating mode signal. A first maximum slip or a first slip range is assigned to the first operating mode and a second maximum slip or a second slip range is assigned to the second operating mode.

Control apparatuses for anti-slide systems set actuator devices of braking devices in such a way that in particular excessive slip between wheels and rails in contact therewith is avoided. Damage or increased wear to rail and wheel is, thus, avoided and nonetheless the shortest possible braking distances are to be achieved here even in the event of different rail conditions or adhesion states, which are changed, for example, by environmental influences. If the slip ranges are permanently selected deviating from the standard (see, for example, UIC 541-05), in particular the minimum value of the slip is too small or the maximum value of the slip is too large, this then results (in the case of excessive slip) in increased wear on the running surfaces of the wheels and the rails due to the elevated friction. This causes increased operating costs for maintenance work.

Further, the maximum slip or slip range can be adapted to the respective operating mode or operating situation of the brake. In situations in which it is necessary, increased wear can, thus, be accepted, while otherwise the wear is reduced.

Still further, in at least one embodiment, the first maximum slip or slip range is a maximum slip or slip range specified by a norm and the second slip range is a predetermined and stored maximum slip or slip range, which is then used by the control apparatus to effectuate increased, optimally the maximum available force transmission between wheel and rail. The second maximum slip or slip range is, for example, vehicle-dependent, velocity-dependent, and/or friction force-dependent and is determined experimentally and/or by simulation. It can, thus, be dependent on multiple variables and is then stored as a characteristic map.

One or more mathematical formula(s) (for example, determined by simulation or fitted to experimental data) can also be stored for the determination of the second maximum slip or slip range, and corresponding values of variables, which are necessary for calculating the second maximum slip or second slip range, could be read in from corresponding inputs.

In the first operating mode, the priority of the slip control device can, thus, be to achieve the lowest possible wear of the wheel running surfaces/the rail(s) and accordingly to limit the maximum slip/slip range. In the second operating mode, the priority of the slip control device can be to achieve the best possible braking action, without taking the wear into consideration. The maximum slip/slip range is accordingly limited/expanded in another way. In particular, it can be provided in this case that the maximum values for the slip according to the norm are exceeded. This can in particular make emergency braking actions/rapid braking actions more effective and can, thus, increase the level of safety.

In a further embodiment, the slip limiting device has a third operating mode, to which a third maximum slip or slip range is assigned. The third maximum slip or slip range is selected for activating the actuator device for the case in which the braking device/the anti-slide system or an arbitrary part of the braking system at least partially has a malfunction (so-called failsafe mode). The third maximum slip or slip range could be, for example, the slip range defined in the norm.

This has the technical utility that upon a malfunction, a braking action adapted thereto is settable.

Furthermore a control method for a control device of an anti-slide system is provided, wherein the anti-slide system has at least one actuator device for setting a braking force of a braking device of a wheel and at least one sensor device for detecting at least one state variable. The method has the following operations:

detecting an operating mode signal; setting, on the basis of the operating mode signal, at least one first or second operating mode; defining, on the basis of the operating mode, the predetermined slip range at a first or a second maximum slip or slip range, determining optimum slip or slip range, selecting minimum from maximum and optimum slip; regulating an activation value for the actuating device in order to set the slip in a predetermined slip range.

This method has the technical utility that the maximum slip/slip range can be adapted to the respective operating mode or operating situation of the brake. In situations in which it is necessary, increased wear can, thus, be accepted, while the wear is otherwise reduced when achieving shorter braking distances.

In a further embodiment, the control method furthermore comprises the following operations: determining the first maximum slip or slip range on the basis of the specifications of a norm and determining the second maximum slip or slip range in such a way that a maximum force transmission is effectuated between wheel and rail.

In the first operating mode, the priority of the slip control device can, thus, be to achieve a low wear of the wheel running surfaces/rails and to limit the slip range accordingly. In the second operating mode, the priority of the slip control device can be to achieve the best possible braking action, without taking the wear into consideration. The maximum slip/slip range is accordingly limited in another way. In particular, it can be provided in this case that the maximum values for the slip according to the norm are exceeded. This makes rapid braking actions more effective in particular and, thus, increases the level of safety.

The second maximum slip or slip range is preferably dependent on multiple variables, for example, vehicle-dependent, velocity-dependent, and/or friction force-dependent.

The second maximum slip or slip range can be determined experimentally and/or by simulation here and/or can be stored as a characteristic map in the control device.

Therefore, for example, various values for the second maximum slip or slip range can be specified for various velocities—which permits even more accurate or optimized slip control.

Furthermore, at least one mathematical formula for the determination of the second maximum slip or second slip range is preferably stored in the control apparatus, and corresponding values of variables which are necessary for calculating the second maximum slip or second slip range are read in from corresponding inputs.

FIG. 1 shows an anti-slide system 10 for a rail vehicle having a braking device 12. The anti-slide system 10 has a control apparatus 14, a sensor device formed by a rotational velocity sensor 16, and an actuator device 18. The actuator device 18 is formed by a valve which controls a pressure in a brake cylinder of the braking device 12. The actuator device 18 is activatable by the control apparatus 14 by an output device.

The control apparatus 14 records state variables and measured variables for processing by input devices. For example, the rotational velocity sensor 16 transmits a rotational velocity of the wheel 24 to the control apparatus 14, wherein the value of the rotational velocity of the wheel 24 is transferred to the slip control device 22. A further sensor device (not shown) transmits a travel velocity of the vehicle 26 as a state variable to the control apparatus 14, wherein the value of the travel velocity of the vehicle 26 is also transferred to the slip control device 22.

The slip limiting device 20 transfers a maximum slip value 28, in an alternative embodiment in the form of a binary information signal, to the slip control device 22 and, thus, defines a slip range, which the slip control device 22 can use upon the activation of the actuator device 18. The permitted slip range is in this case between the slip 0 (no slip) and the maximum slip 28. The first slip range 30 (norm slip) and the second slip range 32 (SB slip) are stored, in the present embodiment in the slip limiting device 20. The maximum value 30a, 32a of one of the stored slip ranges 30, 32 is selected as the maximum slip 28 by a selector switch 34. The lower limit 0 of the slip range is defined in the slip control device 22 and does not also have to be transferred.

The selector switch 34 is switched over by an operating mode signal 36, in particular from an emergency braking loop.

The slip control device 22 calculates, from the state variables 24, 26 and the maximum slip 28, an optimized slip at which the best braking effect is achieved and the maximum slip 28 is not exceeded and forms an activation signal 38 therefrom to set the actuator device 18.

Figure 2:
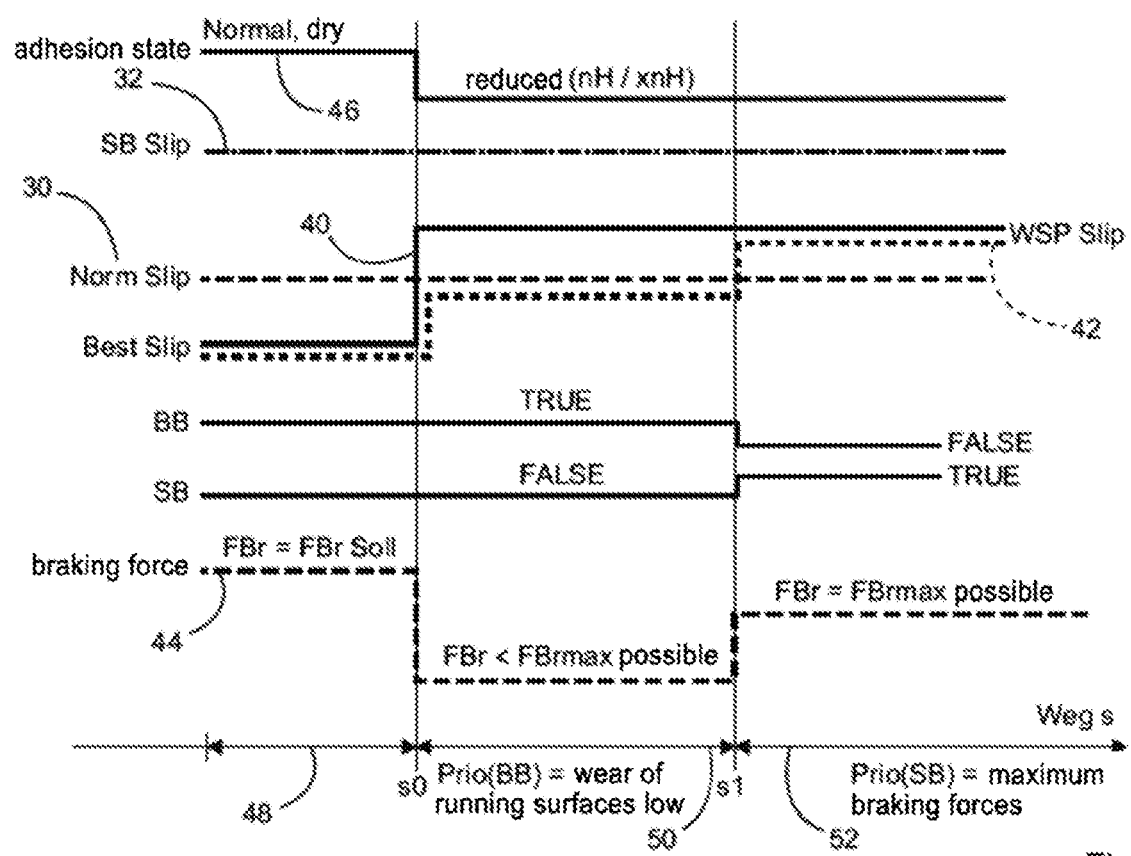
FIG. 2 shows a diagram having state variables and slip ranges according to a disclosed embodiment.

FIG. 2 shows the function of the control apparatus by way of example. The diagram shows, for a path s covered by way of example, in sections respectively the first slip range 30, the second slip range 32, a best slip 40 ascertained by the slip control device 22, and the slip 42 optimized in the scope of the permitted slip range 30/32. Furthermore, FIG. 2 shows a braking force 44, thus, achieved and an adhesion state 46 of the contact between wheel and rail, which is determined by environmental influences.

The anti-slide system 10 has two operating modes. The first operating mode BB is an operating mode as a service brake for normal operation. The second operating mode SB is an operating mode as a rapid brake, in particular for emergency braking operations.

In a first distance section 48, the adhesion state 46 is good. The contact between wheel and rail is dry. The service brake BB is set as the operating mode (BB=True, SB=False). The first slip range 30 is selected by this operating mode. The slip control device 22 calculates a best slip 40 on the basis of a desired braking force FBr target. The best slip 40 in this path section is below the maximum value of the first slip range 30 and at the same time forms the optimized slip 42, because of which the actuator device 18 is not activated in this case.

In a second path section 50, the adhesion state 46 is worse. The contact between wheel and rail only permits reduced force transmission, for example, caused by moisture or leaves. The service brake BB is still set as the operating mode. The best slip 40 calculated by the slip control device 22 is now, due to the reduced force transmission between wheel and rail, above the maximum slip determined by the first slip range 30. The optimized slip 42 is, thus, defined by the slip control device 22 at the maximum permitted slip 30a of the first slip range 30. At the same time, the braking force FBr is, thus, less than a maximum achievable braking force FBrmax, since a greater slip than defined by the first slip range 30 would be necessary to achieve the maximum achievable braking force FBrmax.

The first slip range 30 is defined so that the wear caused by the slip on running surfaces of the wheels is as low as possible with shortening of the braking distances at the same time. For this purpose, the first slip range 30 can be defined on the basis of a corresponding industry norm.

A third path section 52 differs from the second path section 50 solely in that now the rapid brake (BB=False, SB=True) is set as the operating mode. The second slip range 32 is, thus, selected. The best slip 40 determined by the slip control device 22 is within the second slip range 32 and, thus, now forms the optimized slip 42, on the basis of which the actuator device 18 is activated. A significantly higher braking force with identical external conditions is, thus, achieved in relation to the second path section 50. However, the wear caused by the slip on the running surfaces of the wheels/on the rail is, thus, also increased. The operating mode rapid brake is therefore only selected if it is necessary that the rail vehicle stops as rapidly as possible, for example, during an emergency braking operation.

Figure 3:
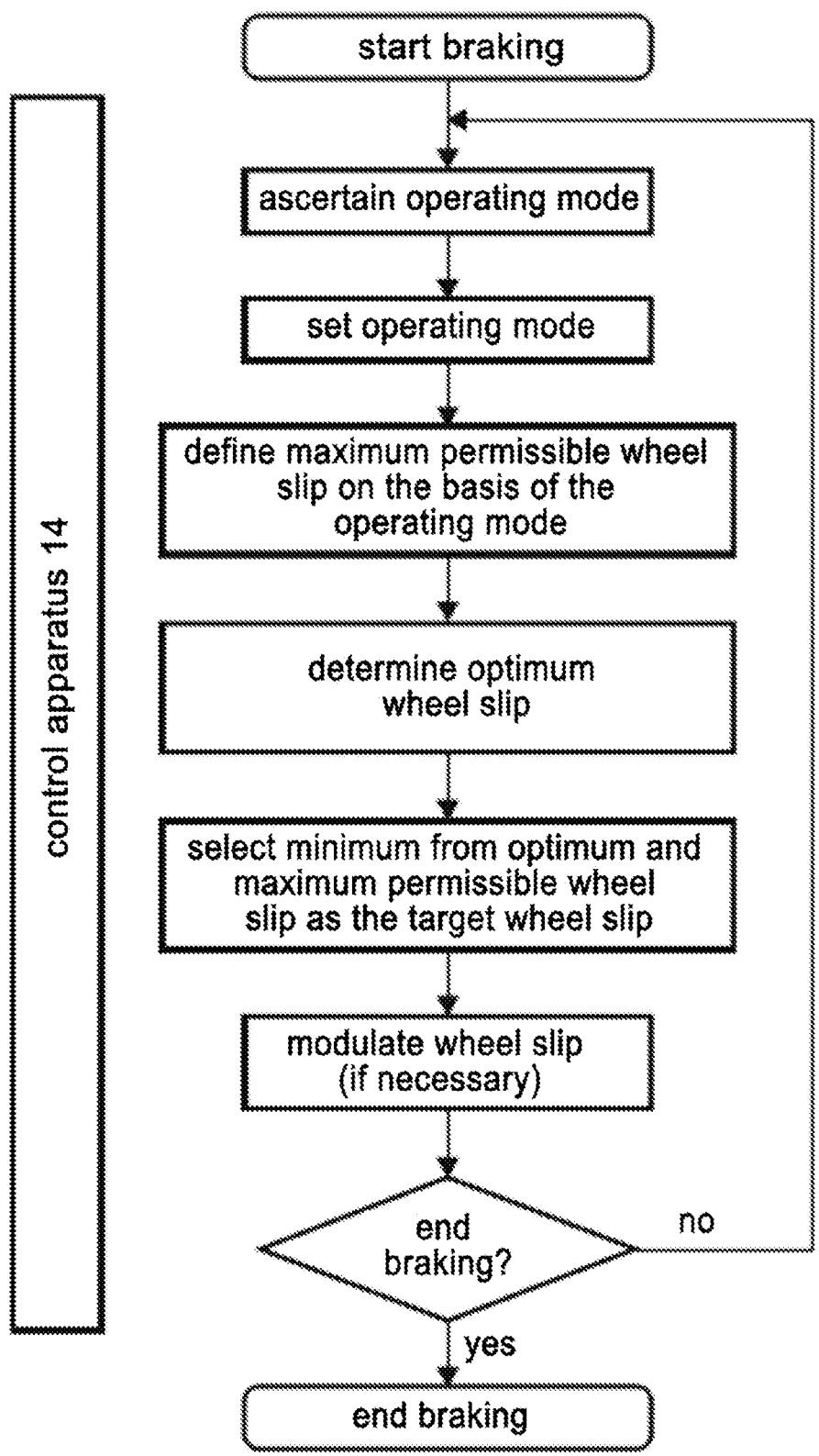
FIG. 3 shows a flow chart of a method according to a disclosed embodiment.

FIG. 3 shows a flow chart of the method which once again illustrates the operations according to a disclosed embodiment carried out by the control apparatus 14: First, an operating mode is ascertained. Subsequently, the operating mode is set, in the present case the first or the second operating mode as described above. The maximum permissible wheel slip is then defined on the basis of the defined operating mode. After the determination of the optimum slip, the selection of the minimum from the two slip values (maximum permissible wheel slip and target wheel slip) takes place. This is then modulated (if necessary) and the method is repeated cyclically.

The following further embodiments are also conceivable.

The control apparatus 14 can be embodied, for example, as a digital computer, other embodiments, for example as an analog computer, are also conceivable, however.

Sensor devices, in particular the rotational velocity sensor 16, can provide the measured state variables, for example, via digital interfaces. In a further alternative embodiment, the sensor devices provide their measured state variables in analog form. In this case, the control apparatus 14 has corresponding conversion devices, for example, A/D converters.

The actuator device 18 can have, for example, a digital input device, a signal processing device, and/or a signal amplifier in order to be connectable to a digital output of the control apparatus 14.

In a further alternative embodiment, the slip limiting device 20 has further operating modes. Thus, for example, a restricted operating mode (degraded mode) can be provided for the case that parts of the brake controller or parts of the brake actuator system have failed. In this case, for example, it can be provided that the highest braking force is always selected, thus, the slip range is selected to be very large.

To further increase the level of safety, it would be possible in alternative embodiments, for example, to provide different control apparatuses 14 for different operating modes, which are each activated upon the presence of an operating mode. Furthermore, for example, the control apparatuses 14 could also be provided with priorities, so that a higher prioritized control apparatus 14 can override the activation of the actuator device 18 by a lower prioritized control apparatus 14.

Disclosed embodiments, thus, make it possible to react to emergency situations in spite of continued low maintenance costs and, thus, for the level of safety of the rail vehicle to be increased.

In further embodiments, the slip limiting device 20 and the slip control device 22 can be embodied in at least two separate devices or can be integrated into one device.

In further embodiments, the slip limiting device 20 and the slip control device 22 can be embodied in differing safety integrity.

The operating mode signal 36 can furthermore be embodied as one or more signals. These can be pneumatic (for example main air line) and/or binary electric (for example emergency braking loop) and/or electronic signals (for example bus signals).

The signal of maximum permitted slip 28 can be embodied as at least one binary electric signal and/or as at least one electronic signal. Depending thereon and the information, thus, transmittable, the values of the first slip range 30 and/or the second slip range 32 (or first maximum slip 30a or second maximum slip 32a) can be stored in the slip limiting device 20 and/or in the slip control device 22 (in the latter variant, the content of the maximum permitted slip signal is reduced to "restriction active" or "restriction not active"). The first and second slip range 30, 32 can be embodied both as maximum values 30a, 32a and/or as ranges limited on the top and/or bottom.

LIST OF REFERENCE SIGNS

10 anti-slide system
12 braking device
14 control apparatus
16 rotational velocity sensor
18 actuator device
20 slip limiting device
22 slip control device
24 rotational velocity of the wheel (state variable)
26 travel velocity of the vehicle (state variable)
28 maximum permitted slip
30 first slip range
30a maximum first slip
32 second slip range
32a maximum second slip 34 selector switch
36 operating mode signal
38 activation signal
40 best slip
42 optimized slip (set)
44 braking force
46 adhesion state
48 first path section
50 second path section
52 third path section

The invention claimed is:

1. A control apparatus for an anti-slide system of a rail vehicle, wherein the anti-slide system has at least one activatable actuator device for setting a braking force of a braking device of a wheel and at least one sensor device for detecting at least one state variable, wherein the control apparatus comprises:
an input device for recording the detected state variable;
an output device for activating the actuator device;
a slip control device configured to ascertain and control a slip between at least one wheel and a rail operationally connected thereto from the detected state variables, wherein the slip control device is configured to activate the actuator device by the output device; and
a slip limiting device configured to specify a maximum slip or slip range for the slip control device,
wherein the slip limiting device has at least one first operating mode and one second operating mode, wherein a selector switch is switched over by at least one operating mode signal from an emergency brake loop, and
wherein a first maximum slip or slip range is assigned to the first operating mode and a second maximum slip or slip range is assigned to the second operating mode.

2. The control apparatus of claim 1, wherein the first maximum slip or slip range is a maximum slip or slip range optimized with respect to wear and/or braking distance, and
wherein the second maximum slip or slip range is a predetermined and stored maximum slip or slip range, which is then used by the control apparatus to effectuate a maximum available and/or optimized force transmission between wheel and rail.

3. The control apparatus of claim 2, wherein the second maximum slip or slip range is vehicle-dependent, velocity-dependent, and/or friction force-dependent and is determined experimentally and/or by simulation,
wherein the second maximum slip or slip range is dependent on multiple variables.

4. The control apparatus of claim 1, wherein the slip limiting device has a third operating mode, to which a third maximum slip or slip range is assigned, wherein the third maximum slip or slip range is selected for activating the actuator device for the case in which the anti-slide system and/or the braking device at least partially has a malfunction.

5. The control apparatus claim 1, wherein the slip limiting device and the slip control device are embodied in at least two separate devices.

6. The control apparatus of claim 1, wherein the slip limiting device and the slip control device are embodied in differing safety integrity.

7. The control apparatus of claim 1, wherein the operating mode signal is embodied as one or more signals, wherein these are pneumatic and/or binary electrical and/or electronic signals.

8. The control apparatus of claim 1, wherein a signal of maximum permitted slip is embodied as at least one binary electrical signal and/or as at least one electronic signal.

9. A control method for a control device of an anti-slide system, wherein the anti-slide system has at least one actuator device for setting a braking force of a braking device of at least one wheel and at least one sensor device for detecting at least one state variable, the control method comprising:
detecting an operating mode signal;
setting, based on the operating mode signal of an emergency brake loop, at least one first or second operating mode;
defining, based on the operating mode, the predetermined slip range at a first or second maximum slip or slip range;
determining optimum slip or slip range;
selecting minimum from maximum and optimum slip; and
regulating an activation value for the actuator device to set the slip in a predetermined slip range.

10. The control method of claim 9, further comprising:
selecting the first slip range based on the specifications of the range optimized by the wear and braking distance; and
selecting the second maximum slip or slip range in such a way that a maximum available force transmission is effectuated between wheel and rail,
wherein the second maximum slip or slip range is preferably a predetermined and stored maximum slip or slip range then used by the control apparatus.

11. The method of claim 10, wherein the second maximum slip or slip range is dependent on multiple variables and is vehicle-dependent, velocity-dependent, and/or friction force-dependent, and wherein the second maximum slip or slip range is determined experimentally and/or by simulation and/or is stored as a characteristic map in the control apparatus.

12. The method of claim 10, wherein at least one mathematical formula for the determination of the second maximum slip or second slip range is stored in the control apparatus, and corresponding values of variables, which are necessary for calculating the second maximum slip or second slip range, are read in from corresponding inputs.

13. The control apparatus of claim 3, wherein optionally at least one mathematical formula is stored for the determination of the second maximum slip or slip range, and corresponding values of variables, which are necessary for calculating the second maximum slip or second slip range, are read in from corresponding inputs.

* * * * *